Figure 1:
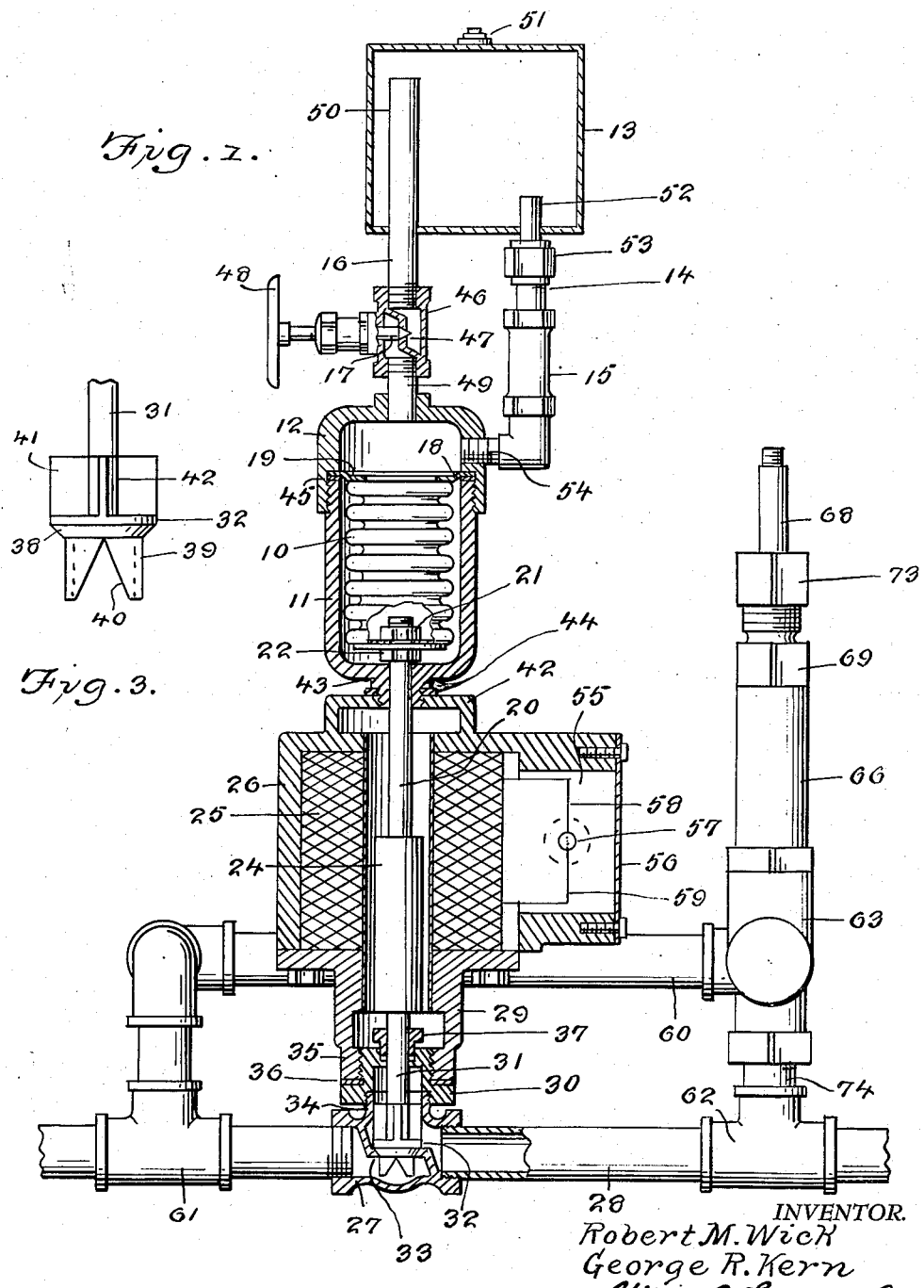

Sept. 22, 1953 R. M. WICK ET AL 2,652,848
HYDRAULIC CONTROL FOR OIL BURNER FUEL SUPPLY VALVES
Filed March 16, 1949 2 Sheets-Sheet 1

INVENTOR.
Robert M. Wick
George R. Kern
BY *Victor J. Evans & Co.*
ATTORNEYS

INVENTOR.
Robert M. Wick
George R. Kern

Patented Sept. 22, 1953

2,652,848

UNITED STATES PATENT OFFICE 2,652,848

HYDRAULIC CONTROL FOR OIL BURNER FUEL SUPPLY VALVES

Robert Maphis Wick, Washington, D. C., and George Robert Kern, Arlington, Va.

Application March 16, 1949, Serial No. 81,755

2 Claims. (Cl. 137—110)

This invention relates to control devices for valves in fuel supply lines to oil burners and the like, and in particular includes a hydraulic delaying unit for a solenoid actuated valve wherein the core of the solenoid is connected to a valve member in a valve body so that as the solenoid is energized the core opens the valve and the opening movement of the core is retarded by a liquid in a confined chamber, the said chamber being provided with a bleeder outlet having a needle valve therein.

The purpose of this invention is to provide a delaying action in a solenoid actuated valve wherein as current is turned on the solenoid does not instantly open the valve but coacts with a hydraulic unit which holds the valve closed and retards the opening movement thereof.

In the usual type of oil burner and particularly in burners designed for commercial use the fuel supply valve opens instantly as current is supplied to the air circulating fan and fuel pump and an excess supply of oil is accumulated in the discharge tube before the fan has reached its maximum speed and this results in a flash of black smoke or what is commonly known as back blast. With this thought in mind this invention contemplates means incorporated in the main operating circuit of the oil burner for holding the fuel supply valve closed and provides a comparatively slow opening movement thereof to permit the fan to reach maximum operating characteristics before the full blast of oil is supplied thereto.

The object of this invention, is therefore, to provide positive means for holding and then retarding the opening movement of fuel supply valves of oil burners and the like.

Another object of the invention is to provide positive holding and retarding means for valves of fuel supply lines of oil burners and the like in which means is provided for adjusting the time interval between the time the current is turned on and the time the valve is in the full open position.

Another object of the invention is to provide a hydraulic unit for controlling the opening movement of solenoid actuated valves wherein fluid used in the unit is recirculated.

Another object of the invention is to provide hydraulic retarding means for solenoid actuated valves in which a by-pass with a relief valve therein is provided around the solenoid actuated valve.

A further object of the invention is to provide a hydraulic control for solenoid actuated valves which is of a comparatively simple and economical construction.

Figure 2:
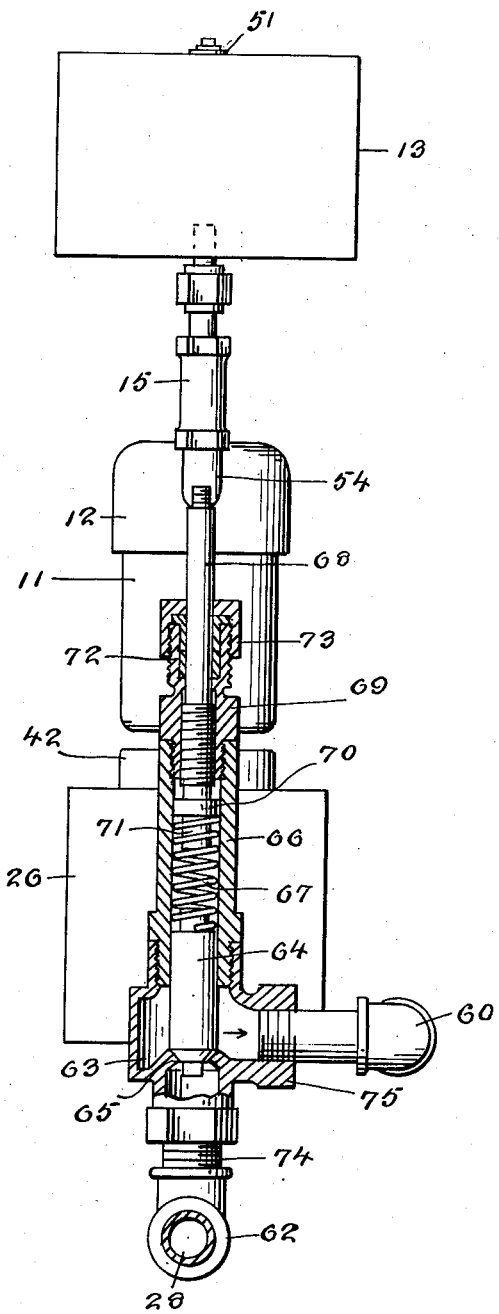

With these and other objects and advantages in view the invention consists of the new and useful construction, combination, and arrangement of parts as hereinafter more fully described, set forth in the claims appended hereto and disclosed in the accompanying drawings forming part hereof, wherein:

Figure 1 is a view showing a vertical section through a solenoid actuated valve with a hydraulic control and showing a pipe line with a by-pass having a relief valve therein in elevation, Figure 2 is a vertical section through the relief valve that is positioned in one end of the by-pass, Figure 3 is a detail showing the valve member of the valve in the fuel supply line.

Referring now to the drawings wherein like reference characters denote corresponding parts the hydraulic control of this invention includes a bellows-type liquid container 10 which is positioned in a casing 11 having a head 12 and the device is provided with a fuel tank 13 with a return connection 14 having a check valve 15 therein, and an outlet connection 16 having a needle valve 17 therein.

The upper open end of the unit 10 is provided with a flange 18 that is clamped between the upper casing 11 and a shoulder 19 of the head 12 as shown in Figure 1. The lower end of the unit 10 is connected to the upper end of the stem 20 by lock nuts 21 and 22 and a washer 23 and the stem 20 is integral with a core 24 of a solenoid 25 that is positioned in a housing 26 and connected to a valve body 27 in a fuel supply line 28 through a base 29 and a bushing 30. The lower end of the core 24 is connected by a stem 31 to a valve member 32 which is shown in detail in Figure 3 and which is positioned to coact with a horizontally disposed valve seat 33 in the valve body 27.

The valve body is provided with an upwardly extended bonnet carrying neck 34 having a cylindrical opening therein that provides a guide for the valve member and the bushing 30 is threaded on the neck 34 and also threaded into a boss 35 of the base 29. A gasket 36 is provided between the bushing and boss and a packing gland 37 is provided in the inner end of the bushing. The packing gland also provides additional guide means for the stem 31 whereby the valve member is maintained in alignment with the valve seat.

The valve member is provided with a bevel surface 38 that coacts with the valve seat 33, and a depending skirt 39 with V-shaped openings 40 therein extends downward below the beveled surface. The upper part of the valve member is provided with radially disposed webs 41 that extend outwardly from a hub 42 to which the stem 31 is attached.

The solenoid housing 26 is provided with an upper section 42 in which a boss 43 at the lower end of the casing 11 is threaded and a gasket 44 is provided between the boss and upper surface of the section 42. A gasket 45 is also provided between the upper edge of the casing 11 and the shoulder 19 of the head 12.

The needle valve 17 includes a valve body 46 with a valve seat 47 and the needle or valve member is controlled with a hand wheel 48. The valve body is attached to the head 12 by a tube 49 which is aligned with the connection 16 and it will be noted that the upper end of the connection extends to a point 50 in the upper part of the tank 13.

The tank 13 is provided with a filling plug 51 and the return connection 14 extends into the tank through a nipple 52 having a union 53 therein, and the lower end of the return connection is provided with an elbow 54 that is threaded into the head 12 of the casing 11.

The housing 26 is provided with a compartment 55 having a cover plate 56 and a terminal 57 for wires 58 and 59 of the solenoid 25 is positioned in this compartment for a conduit extended through the side thereof.

The fuel supply line 28 is provided with a by-pass 60 which is connected around the valve body 27, being connected to fittings 61 and 62, and a relief valve 63, as shown in detail in Figure 2, is provided in the by-pass.

The relief valve 63 is provided with a valve member 64 that seats upon a valve seat 65, and the valve member which is slidably mounted in an upwardly extended cylindrical casing 66 is resiliently held against the seat by a spring 67. The tension on the spring is adjusted by an upwardly extended stem 68 that is threaded into a bushing 69 and this is provided with a collar 70 with an extended end 71 that holds the upper end of the spring. The bushing 69 is provided with a packing gland 72 and the gland is sealed around the stem 68 by a nut 73. The relief valve extends from the fitting 62 to which it is connected by a nipple 74 and the by-pass 60 extends from a side connection 75 of the valve to the fuel supply line 28 through the fitting 61. It will be understood that a relief valve of any other type or design may be used and any suitable means may be used for adjusting the tension of the spring to regulate the valve whereby it will open at a predetermined pressure. When the oil is below normal operating temperature (160° F.), the flow of oil through the control valve will be very slow due to the high viscosity of the oil. Therefore, the by-pass has been provided and the by-pass is actuated when the pressure on the supply line reaches a certain point. The oil will flow through this by-pass until the pressure in the supply line is reduced by heating of the oil below that required to open the by-pass valve.

It will be understood that other modifications may be made in the design and arrangement of the parts without departing from the spirit of the invention.

What is claimed is:

1. In a liquid fuel supply valve control, the combination which comprises a valve body having a horizontally disposed valve seat therein, a valve member positioned to coact with the valve seat for closing the valve, a bellows-type fluid unit having a confined internal chamber integrally connected to the said valve member and positioned to retard opening movement of said valve member, a bleeder connection in said bellows-type unit chamber for retarding the flow of fluid therefrom to retard the opening movement of the said valve member, a needle valve in said bleeder connection for regulating the flow of fluid therethrough, a fluid supply tank communicating with said bleeder connection with a check valve therein for return of fluid to the said bellows-type fluid chamber, and a by-pass connection with a relief valve therein around said fuel supply valve.

2. A liquid fuel supply valve control as in claim 1 wherein said fluid unit is integrally connected to said valve member by a valve stem, said valve body is provided with a guide for said valve stem and a packing gland is carried by said guide for sealing said guide.

ROBERT MAPHIS WICK.
GEORGE ROBERT KERN.

References Cited in the file of this patent

UNITED STATES PATENTS

| Number | Name | Date |
| --- | --- | --- |
| 583,302 | Ewart | May 25, 1897 |
| 675,969 | Parry | June 11, 1901 |
| 803,189 | Palmer | Oct. 31, 1905 |
| 1,383,432 | Simon | July 5, 1921 |
| 1,560,439 | Trenor | Nov. 3, 1925 |
| 1,791,012 | Ray | Feb. 3, 1931 |
| 2,108,979 | Wile | Feb. 22, 1938 |
| 2,110,534 | Snow | Mar. 8, 1938 |
| 2,469,038 | Winkler | May 3, 1949 |
| 2,543,010 | Gardner | Feb. 27, 1951 |

FOREIGN PATENTS

| Number | Country | Date |
| --- | --- | --- |
| 174,361 | Germany | July 24, 1906 |